US010394477B2

(12) United States Patent
Li et al.

(10) Patent No.: US 10,394,477 B2
(45) Date of Patent: *Aug. 27, 2019

(54) METHOD AND SYSTEM FOR MEMORY ALLOCATION IN A DISAGGREGATED MEMORY ARCHITECTURE

(71) Applicant: INTERNATIONAL BUSINESS MACHINES CORPORATION, Armonk, NY (US)

(72) Inventors: Zhong Li, Shanghai (CN); Xian Dong Meng, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,893

(22) Filed: Dec. 13, 2017

(65) Prior Publication Data

US 2018/0253246 A1 Sep. 6, 2018

Related U.S. Application Data

(63) Continuation of application No. 15/446,093, filed on Mar. 1, 2017.

(51) Int. Cl.
*G06F 12/00* (2006.01)
*G06F 3/06* (2006.01)

(52) U.S. Cl.
CPC .......... *G06F 3/0631* (2013.01); *G06F 3/0604* (2013.01); *G06F 3/067* (2013.01)

(58) Field of Classification Search
CPC ....... G06F 3/0631; G06F 3/0604; G06F 3/067
See application file for complete search history.

(56) References Cited

U.S. PATENT DOCUMENTS

| 7,793,051 | B1* | 9/2010 | Nguyen | G06F 9/5016 |
| | | | | 711/147 |
| 8,140,719 | B2 | 3/2012 | Lauterbach et al. | |
| 9,767,856 | B2 | 9/2017 | Shinsato | |
| 2007/0288255 | A1* | 12/2007 | Cai | G06Q 10/06 |
| | | | | 711/170 |
| 2009/0193503 | A1* | 7/2009 | Shevehenko | H04L 63/0272 |
| | | | | 726/4 |

(Continued)

FOREIGN PATENT DOCUMENTS

IN 201647044748 A 1/2017

OTHER PUBLICATIONS

IBM: List of IBM Patents or Patent Applications Treated as Related (Appendix P), Dec. 28, 2017, pp. 1-2.

(Continued)

*Primary Examiner* — Gurtej Bansal
(74) *Attorney, Agent, or Firm* — Richard A. Wilhelm

(57) ABSTRACT

Embodiments of the present invention disclose a method, computer program product, and system for allocating memory. A computer receives a request for memory to be allocated to a computer node and determines if the allocation request needs to be carried out on a cluster level, a server rack level, or on a server level. The computer retrieves a memory policy associated with the determined level the allocation request needs to be carried out on from a memory policy database and determines how much available memory may be allocated and if there enough available memory to meet the request. The computer reallocates the available memory to address the received the received request based on the retrieved memory policy.

11 Claims, 7 Drawing Sheets

(56) References Cited

U.S. PATENT DOCUMENTS

| | | | |
|---|---|---|---|
| 2012/0226699 A1* | 9/2012 | Lillibridge | G06F 17/30336 707/747 |
| 2013/0054929 A1* | 2/2013 | Baik | G06F 12/126 711/170 |
| 2013/0290643 A1 | 10/2013 | Lim et al. | |
| 2013/0297869 A1* | 11/2013 | Mills | G06F 3/0674 711/112 |
| 2014/0059228 A1 | 2/2014 | Parikh | |
| 2014/0280687 A1 | 9/2014 | Egi et al. | |
| 2014/0359044 A1 | 12/2014 | Davis et al. | |
| 2015/0186069 A1 | 7/2015 | Sharma et al. | |
| 2016/0055119 A1 | 2/2016 | Egi et al. | |
| 2016/0110136 A1 | 4/2016 | Saxena et al. | |
| 2016/0117129 A1 | 4/2016 | Shrader et al. | |
| 2016/0124872 A1 | 5/2016 | Shrader et al. | |
| 2016/0179383 A1 | 6/2016 | Krithivas et al. | |

OTHER PUBLICATIONS

Pending U.S. Appl. No. 15/850,501, filed Dec. 21, 2017, entitled: "Method and System for Memory Allocation in a Disaggregated Memory Architiecture", pp. 1-33.

Samih et al., "Evaluating Dynamics and Bottlenecks of Memory Collaboration in Cluster Systems", 2012 12th IEEE/ACM International Symposium on Cluster, Cloud and Grid Computing, pp. 107-114.

Lim et al., "Disaggregated Memory Benefits for Server Consolidation", HP Laboratories, HPL-2011-31, Mar. 6, 2011, pp. 1-7.

Zhao et al., "Buri: Scaling Big-memory Computing with Hardware-based Memory Expansion", ACM Trans. Architec. Code Optim. 9, 4, Article 39 (Mar. 2015), 22 pages.

Han et al., "Network Support for Resource Disaggregation in Next-Generation Datacenters", Hotnets '13, Nov. 21-22, 2013, pp. 1-7.

Woodacre et al., "The SGI® Altix™ 3000 Global Shared-Memory Architecture", White Paper, Jan. 16, 2003, pp. 1-10.

Mell et al., "The NIST Definition of Cloud Computing", National Institute of Standards and Technology, Special Publication 800-145, Sep. 2011, 7 pages.

Pending U.S. Appl. No. 15/446,093, filed Mar. 1, 2017, entitled: "Method and System for Memory Allocation in a Disaggregated Memory Architecture", pp. 1-38.

* cited by examiner

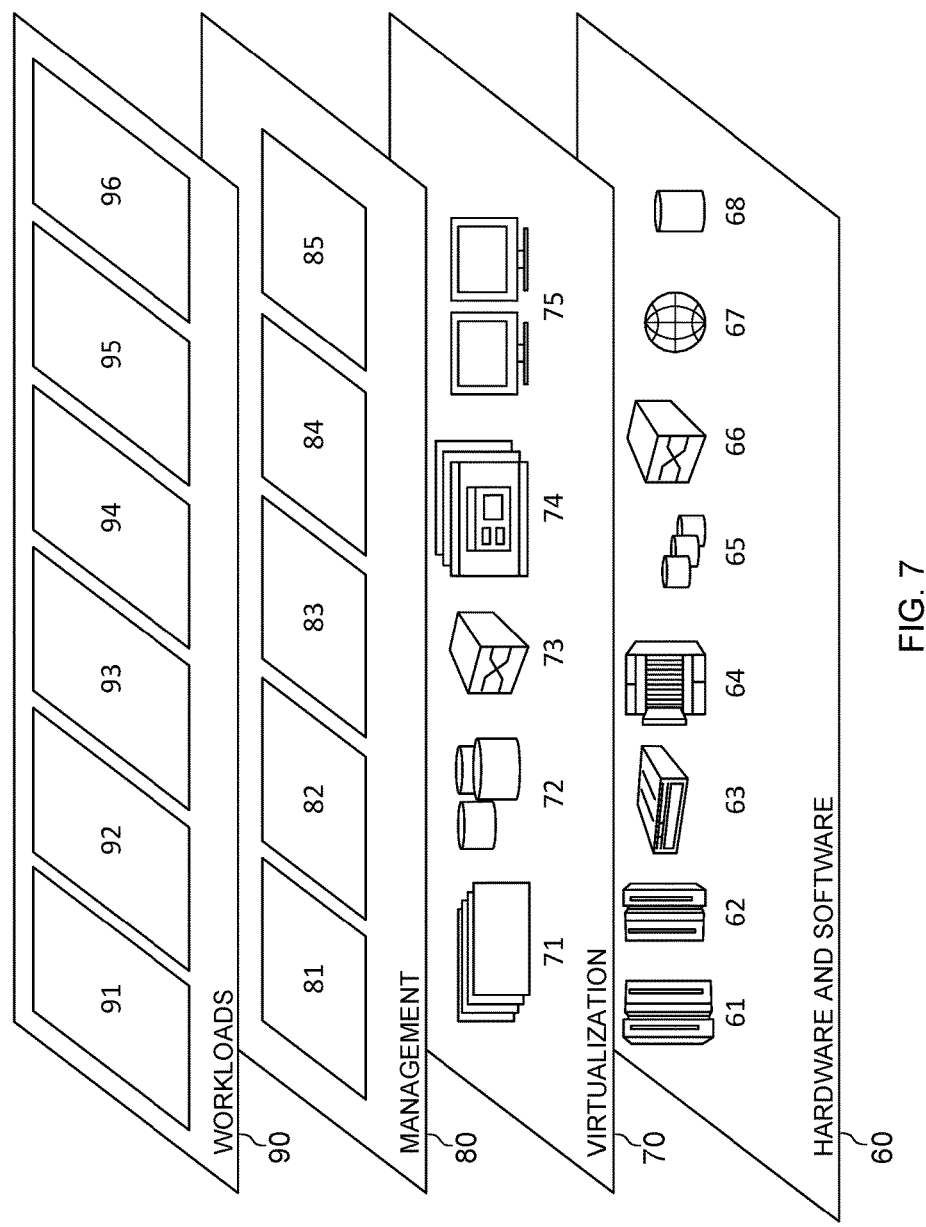

METHOD AND SYSTEM FOR MEMORY ALLOCATION IN A DISAGGREGATED MEMORY ARCHITECTURE

BACKGROUND

The present invention relates generally to the field of computer memory, and more particularly to allocation of memory in a server level, rack, and/or cluster farm.

Today it is common to run a big workload with hundreds of servers as a cluster. When a particular workload consumes almost all the memory, the system cannot leverage the remaining computing power on that server although the CPU utilization is still low. The typical approach to solve this problem is to transform the workload into a scale-out design so that the small workload can be dispatched to other servers in this cluster. However, there are still two problems this approach. First, if this workload is a memory-intensive workload that cannot be transformed into a scale-out architecture, this will become a hot-spot in the system performance. Although other servers may have a lot of free memory during non-peak or even idle time, such memory cannot be shared. Second, even though small-granularity workload can be distributed to other servers via delicate software architecture design, this will rely on a cluster scheduler to perform this task. It means the transfer of workload state/data across the nodes. In a big data scenario, this violates the "move computing close to data" principle. In both scenarios, these will lead to the waste of computing and memory resource in the cluster.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for allocating memory. A computer receives a request for memory to be allocated to a computer node and determines if the allocation request needs to be carried out on a cluster level, a server rack level, or on a server level. The computer retrieves a memory policy associated with the determined level the allocation request needs to be carried out on from a memory policy database and determines how much available memory may be allocated and if there enough available memory to meet the request. The computer reallocates the available memory to address the received the received request based on the retrieved memory policy.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 7 depicts abstraction model layers according to an embodiment of the present invention.

DETAILED DESCRIPTION

Figure 1:
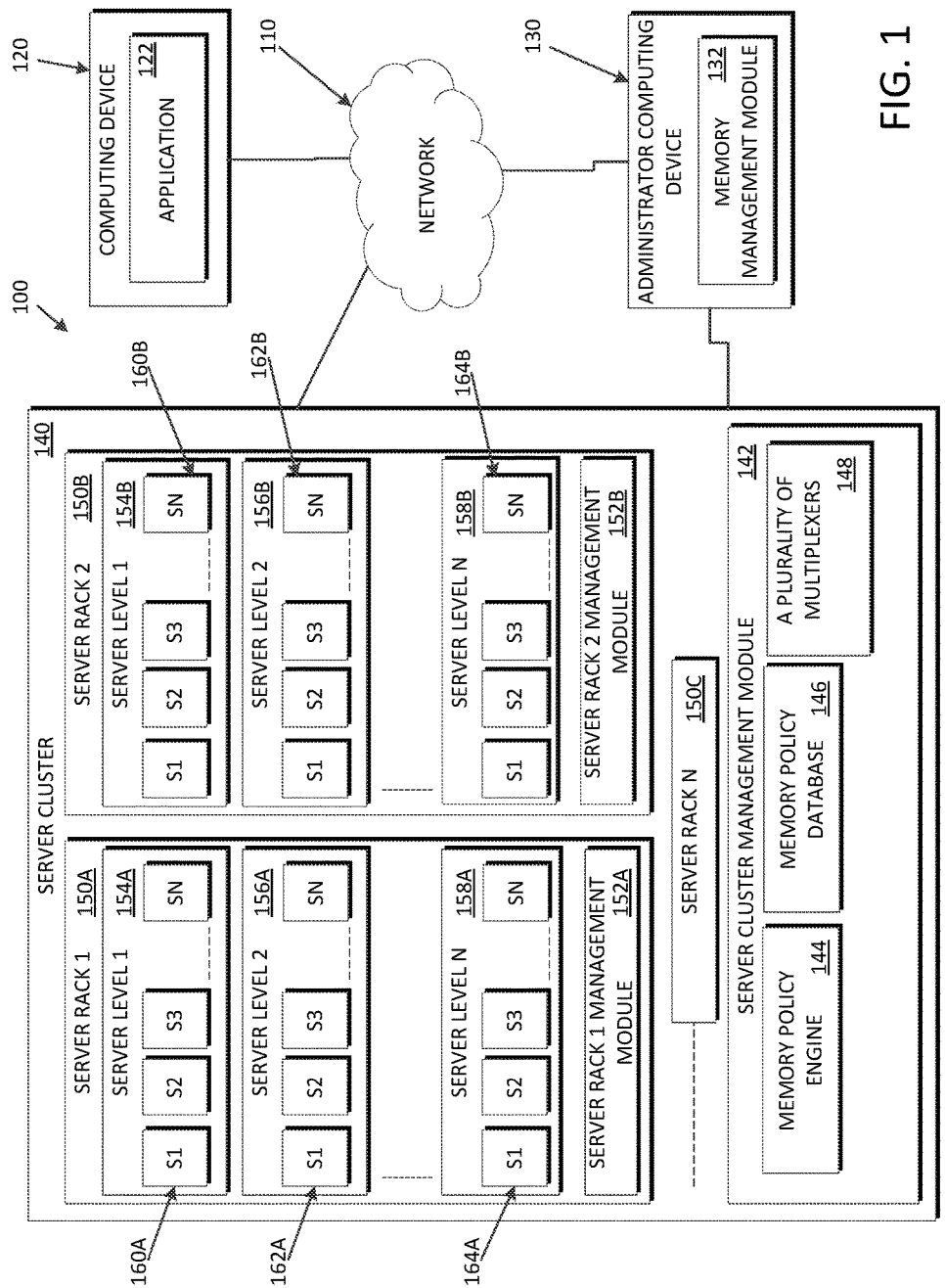
FIG. 1 is a functional block diagram illustrating a distributed data processing environment, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to a system for allocating memory across multiple servers, a server rack, and/or on a cluster level. Using multiplexer (MUX) to create a memory-server topology and allow remapping of the topology of the memory, for example, memory expansion cards (MEC) to be connected to multiple computer nodes, thus allowing the computer nodes to access the MEC.

Figure 2:
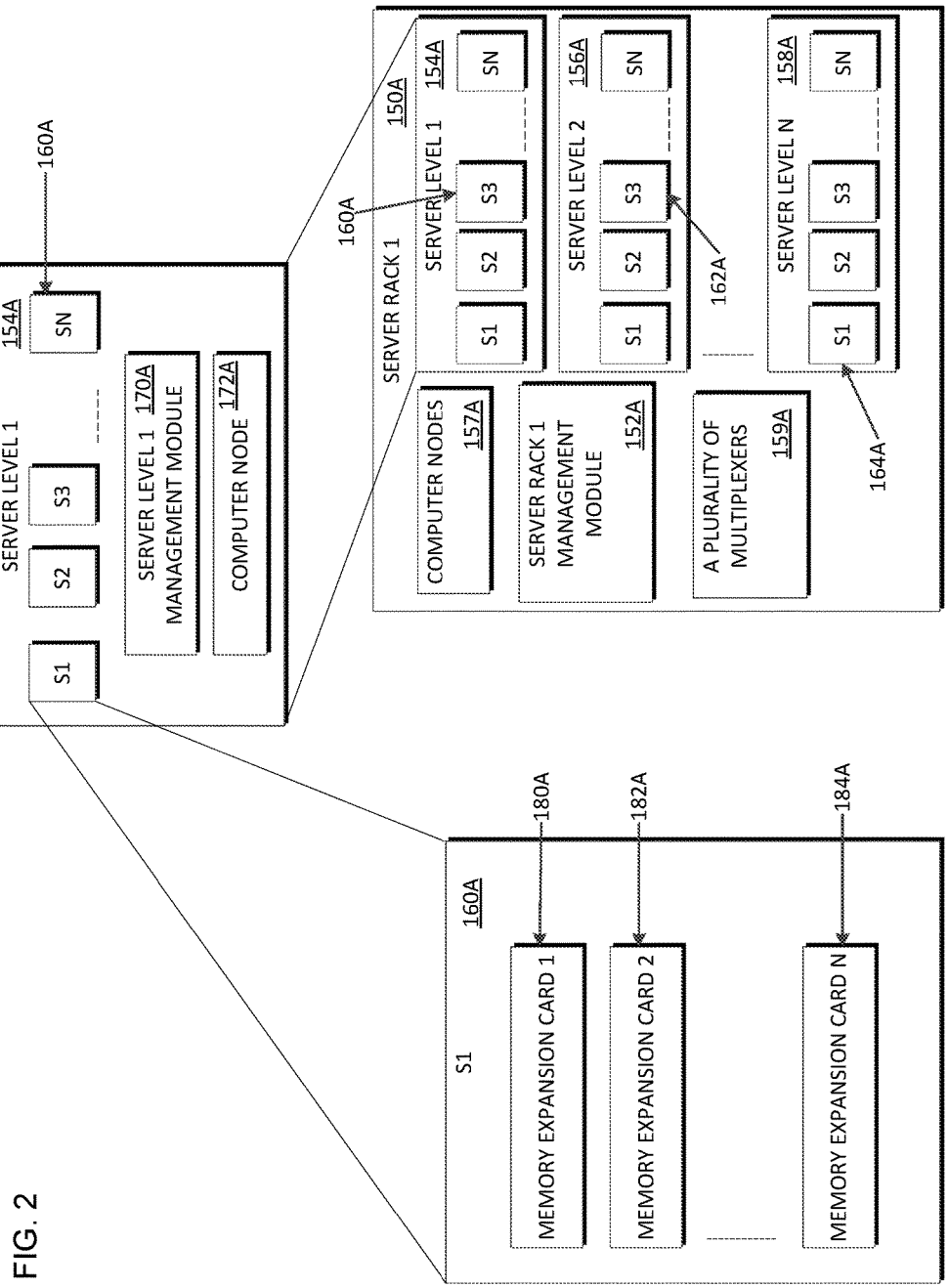
FIG. 2 is a functional block diagram illustrating a server rack, a server level, and an individual server in the data processing environment, in accordance with an embodiment of the present invention.

FIG. 1 is a functional block diagram illustrating a distributed data processing environment 100, in accordance with an embodiment of the present invention. The distributed data process environment 100 includes a computing device 120, an administrator computing device 130, and a server cluster 140 that are able to communicate with each other via a network 110. FIG. 2 is a functional block diagram illustrating a server rack 1 150A, a server level 1 154A, and an individual server 160A in the data processing environment, in accordance with an embodiment of the present invention.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between the computing device 120, server cluster 140, and the administrator computing device 130, in accordance with one or more embodiments of the invention.

The computing device 120 represents a computing device that includes an application 122 that may or may not have a user interface, for example, a graphical user interface. The application 122 may be any type of application that is run on the a server contained within the server cluster 140, for example, the application can be a web application, a graphical application, an editing application or any other type of application/program that requires access to a server on the server cluster 140 and the application 122 requires memory to run the application on the server side.

The computing device 120 may be any type of computing devices that are capable of connecting to network 110, for example, a laptop computer, tablet computer, netbook computer, personal computer (PC), a desktop computer, a smart phone, or any programmable electronic device supporting the functionality required by one or more embodiments of the invention. The user computing device 120 may include internal and external hardware components, as described in further detail below with respect to FIG. 5. In other embodiments, the server cluster 140 may operate in a cloud computing environment, as described in further detail below with respect to FIGS. 6 and 7.

The administrator computing device 130 represents a computing device that includes a memory management module 132 that contains a user interface, for example, a graphical user interface. The memory management module 132 may be any type of application that allows a user to access a memory policy engine 144 and a memory policy database contained within server cluster management module 142, for example, the application can be a web application, a graphical application, an editing application or any other type of application/program that allows to user to write new memory policy using the memory policy engine 144 or to manage the stored policy within the memory policy database 146.

The administrator computing device 130 may be any type of computing devices that are capable of connecting to network 110, for example, a laptop computer, tablet computer, netbook computer, personal computer (PC), a desktop computer, a smart phone, or any programmable electronic device supporting the functionality required by one or more embodiments of the invention. The administrator computing device 130 may include internal and external hardware components, as described in further detail below with respect to FIG. 6. In other embodiments, the server cluster 140 may operate in a cloud computing environment, as described in further detail below with respect to FIGS. 6 and 7.

The server cluster 140 is a server farm that contains a plurality of server racks 150A, 150B to server rack N 150C. Each of the server racks contains a plurality of server levels 154A, 156A, to server level 158A, 154B, 156B, and to server level 158B. Each of the server levels contain a plurality of servers 160A, 162A, 164A, 160b, 162b, and 164b. Each of the server racks 150A, 150B, and 150C includes a server rack management module 152A, and 152B. Most of the description will only reference server rack 1 150A and the components contained therein. However, the below description can be applied to every sever rack/server level/server contained within the server cluster 140.

The server cluster 140 further includes a server cluster management module 142. The sever cluster management module 142 includes a memory policy engine 144, a memory policy database 146, and possibly a plurality of multiplexers (MUX) 148. The server cluster management module 142 controls the allocation of memory, for example, memory expansion cards (MECs) 180A, 182A, to 184A on a cluster wide level.

Each of the plurality of MUX 148 are a device that selects one of several analog or digital input signals and forwards the selected input into a single line. Each of the plurality of MUX 148 can multiple inputs and/or multiple outputs to connected to the computer nodes 157A and 172A and the memory, for example, the memory expansion cards (MECs) 180A, 182A, to 184A. Multiplexers can also be used to implement Boolean functions of multiple variables, for example, the memory allocation policy rules stored in the memory policy database 146.

The memory policy engine 144 allows for an administrator to write, change, and/or delete memory policy allocation rules. The memory policy engine 144 further checks hardware limitations and user allocation configuration so that they can be converted to rules to stored in the memory policy database 146. The memory policy allocation rules can be, for example, based on; a) thresholds, for example, the minimum/maximum number of memory units can be assigned to each of the computer nodes 157A, 172A, or the threshold rule could reference the timeout before one of management modules 142, 152A, 170A and removed an allocated memory unit from the computer nodes 157A or 172A for relocation; b) priority, for example, if one of the computer nodes 157A or 172A sends a request for more memory, while there is not enough and/or any available memory for reallocation, the rule determines in which sequence the memory allocated to other computer nodes 157A or 172A should be reclaimed if not being utilized or should be forcibly removed from the computer nodes 157A or 172A for reallocation; c) granularity, for example, allocating the memory to each of the computer nodes 157A or 172A based on the minimum hardware limitations of the memory and/or computer nodes 157A or 172A. The above list of possible policy rules is not an all-encompassing list of possible policy rules and it is not meant to be a limiting list of possible policy rules. The memory policy stored within the memory policy database 146, can be the same or different for each level of allocation, i.e. cluster lever, rack level or server level.

Server rack 1 150A includes server level 1 154A, server level 2 156A, to server level N 158, computer nodes 157A, server rack 1 management module 152A, and a plurality of Multiplexers (MUX) 159A. The server rack 1 management module 152A controls the allocation of memory, for example, memory expansion cards (MECs) 180A, 182A, to 184A on a server rack wide level.

Each of the plurality of MUX 159A are a device that selects one of several analog or digital input signals and forwards the selected input into a single line. Each of the plurality of MUX 148 can multiple inputs and/or multiple outputs to connected to the computer nodes 157A and 172A and the memory, for example, the memory expansion cards (MECs) 180A, 182A, to 184A. Multiplexers can also be used to implement Boolean functions of multiple variables, for example, the memory allocation policy rules stored in the memory policy database 146. MUX 159A and 148 are disclosed on the cluster and rack level, but the disclosure is not meant to be limited in any way. MUX 159A and 148 can be integrated at one location, combined in several locations, and/or maintained at separate locations for the memory allocation.

Computer nodes 157 includes firmware and an operating system to communicate with the server rack 1 management module 152A and/or server cluster management module 142 to communicate about memory requests, memory failures and general memory status. The operating system of the computer nodes 157 is responsible for handling the memory hot add/remove events, and sends acknowledgements, (partial) failure notifications to the firmware of the computer nodes 157, and it should also be able to decide when to request more memory, or release memory upon request. Based on the demand for memory for an application that is running on the servers will determine the amount of memory requested by computer nodes 157.

Server level 1 includes a plurality of individual servers 160A, a server level 1 management module 170A, and computer nodes 172A. Server level 1 management module 170A controls the allocation of memory, for example, memory expansion cards (MECs) 180A, 182A, to 184A on the server level 1 154A.

Computer nodes 172A includes firmware and an operating system to communicate with the server level 1 management module 170A, server rack 1 management module 152A, and/or server cluster management module 142 to communicate about memory requests, memory failures and general memory status. The operating system of the computer nodes 172A is responsible for handling the memory hot add/remove events, and sends acknowledgements, (partial) failure notifications to the firmware of the computer nodes 172A, and it should also be able to decide when to request more memory, or release memory upon request. Based on the demand for memory for an application that is running on the servers will determine the amount of memory requested by computer nodes 172A.

One or more of the plurality servers S1 to SN 160A may contain at least one or more memory expansion cards (MEC) 180A, 182A, to 184A. The MEC 180A, 182A, to 184A can be assigned by the plurality of multiplexers 148 and/or 159 to a computer nodes 172A and/or 157A per expansion card or by even per a group of dual in-line memory modules (DIMMs) inside expansion unit.

Figure 3:
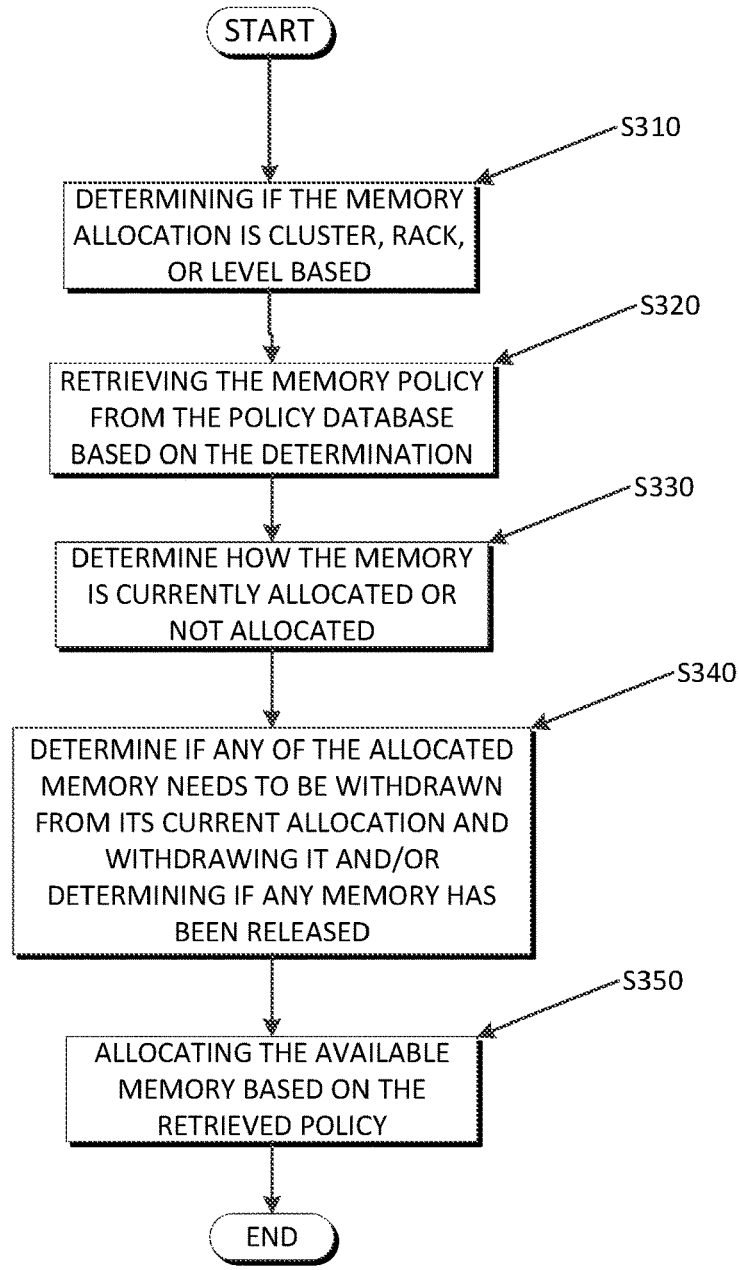
FIG. 3 is a flowchart depicting operational steps of the memory allocation within the data processing environment of FIG. 1, in accordance with an embodiment of the present invention.

FIG. 3 is a flowchart depicting operational steps of the memory allocation within the data processing environment of FIG. 1, in accordance with an embodiment of the present invention.

An administrator can determine if the memory needs to be reallocated and the server cluster management module 142 determines if the memory allocation requests to be carried out on a cluster, rack or level based and refers the request to the appropriate management module (S310). Depending on what the determination is, i.e. if the memory allocation is to be cluster, rack or level, the management module 142, 152A, or 170A for the respective allocation retrieves the memory policy from the memory policy database 146 (S320). The management module 142, 152A, or 170A determines the current allocation of memory, for example, MEC 180A, 182A, and 184A, as to which computer nodes 157A, 172A the memory is assigned or if the memory is currently unassigned (S330). The management modules 142, 152A, or 170A determines if there is enough unallocated memory to meet allocation request, and if not, the management modules 142, 152A, or 170A determines if any of the current allocated memory can be withdrawn from its current allocation (S340). The management module 142, 152A, or 170A withdraw the selected memory from its current allocation and/or determines if the memory has been released from allocation (S340). The management modules 142, 152A, or 170A reallocates the memory based on the retrieved memory policy (S350).

Figure 4:
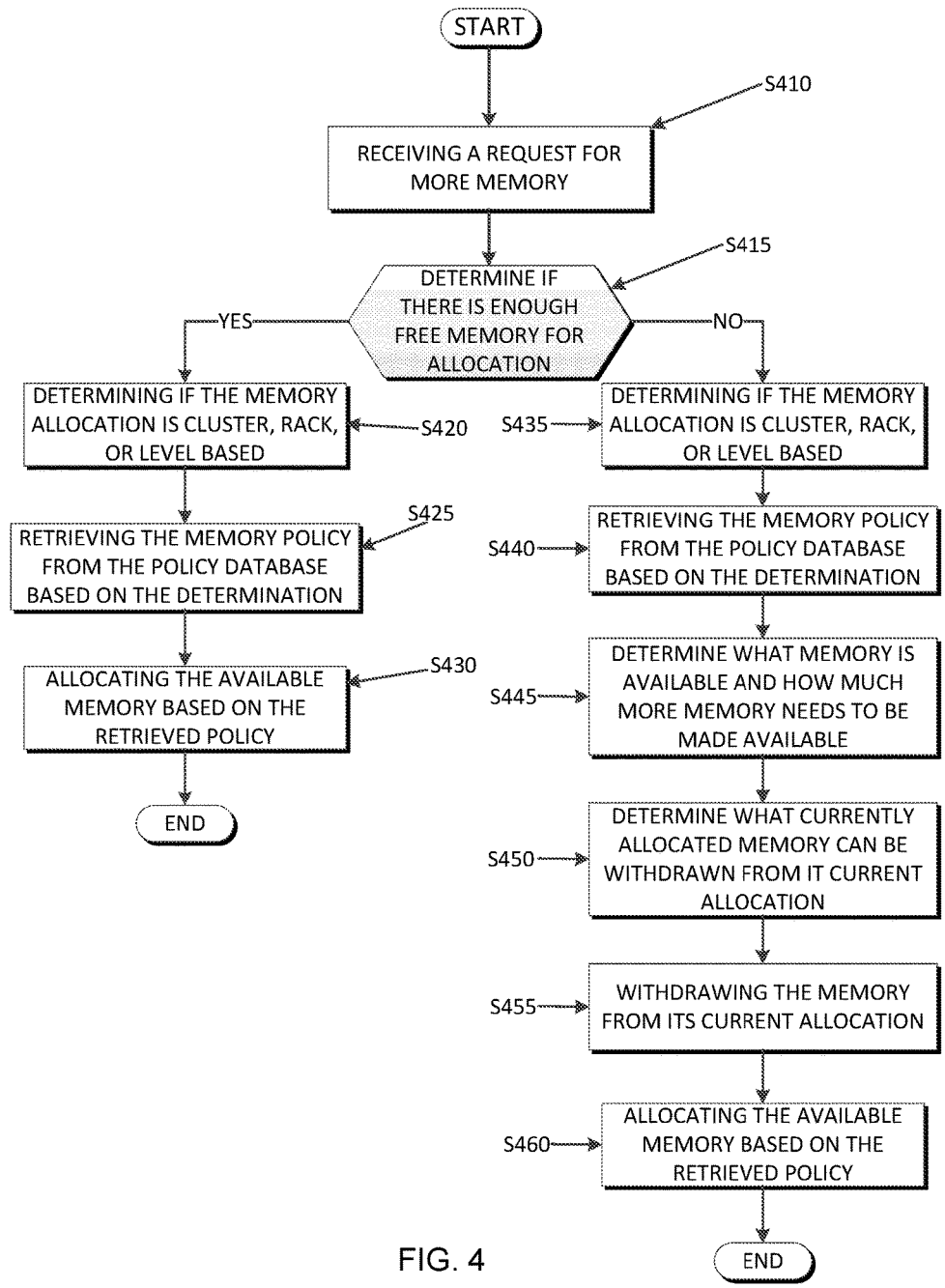
FIG. 4 is a flowchart depicting operational steps of the memory allocation within the data processing environment of FIG. 1, in accordance with an embodiment of the present invention.

FIG. 4 is a flowchart depicting operational steps of the memory allocation within the data processing environment of FIG. 1, in accordance with an embodiment of the present invention.

The server cluster management module 142 receives a request for more memory, wherein the request can be initiated by either an administrator or one of the applications that is running on one of the servers 160A, 162A or 164A can automatically send out a request for more memory (S410). The management modules 142, 152A, or 170A determines if there is enough free or unallocated memory that be assigned to meet the memory request (S415). If there is enough available memory, then the management modules 142, 152A, or 170A determines the memory allocation requests to be carried out on a cluster, rack or level based and refers the request to the appropriate management module (S420). Depending on what the determination is, i.e. if the memory allocation is to be cluster, rack or level, the management module 142, 152A, or 170A for the respective allocation retrieves the memory policy from the memory policy database 146 (S425). The management modules 142, 152A, or 170A reallocates the memory based on the retrieved memory policy, for example, by assigning memory to the one of the plurality of multiplexers 159A and the computers nodes 157A, 172A that is associated with the memory request (S430).

If there is not enough memory available, then the memory will needs to be withdrawn from its current allocation to meet the memory request. Then the management modules 142, 152A, or 170A determines the memory allocation requests to be carried out on a cluster, rack or level based and refers the request to the appropriate management module (S435). Depending on what the determination is, i.e. if the memory allocation is to be cluster, rack or level, the management module 142, 152A, or 170A for the respective allocation retrieves the memory policy from the memory policy database 146 (S440). The management modules 142, 152A, or 170A determine how much memory is available and how much memory that needs to be withdrawn from its current allocation (S445). The management modules 142, 152A, or 170A determines what memory that can be withdrawn from its current allocation (S450) and withdraws the memory from its current allocation (S455). The management modules 142, 152A, or 170A reallocates the available memory and the withdrawn memory based on the retrieved memory policy, for example, by assigning memory to the one of the plurality of multiplexers 159A and the computers nodes 157A, 172A that is associated with the memory request (S460).

Figure 5:
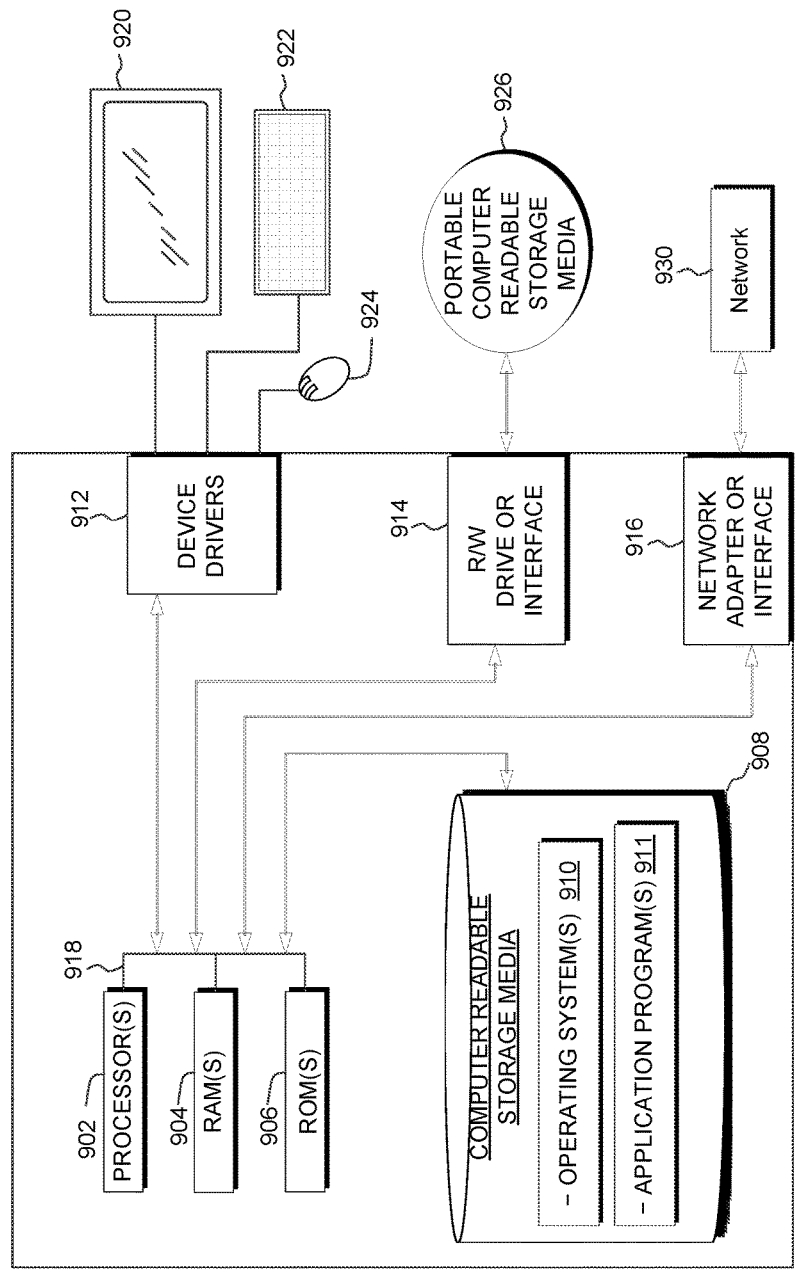
FIG. 5 is a block diagram of components of a computing device of the data processing system of FIG. 1, in accordance with embodiments of the present invention.

FIG. 5 depicts a block diagram of components of the administrator computing device 130 of the distributed data processing environment 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 120, administrator computing device 130, server cluster 140, server rack 150a, server level 1 154A, and/or one of the servers of the plurality of servers 160A may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, server rack 1 management module 152A (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 120, administrator computing device 130, server cluster 140, server rack 150a, server level 1 154A, and/or one of the servers of the plurality of servers 160A may also include a R/W drive or interface 914 to read from and write to one or more portable computer readable storage media 926. Application programs 911 on computing device 120, administrator computing device 130, server cluster 140, server rack 150a, server level 1 154A, and/or one of the servers of the plurality of servers 160A may be stored on one or more of the portable computer readable storage media 926, read via the respective R/W drive or interface 914 and loaded into the respective computer readable storage media 908.

Computing device 120, administrator computing device 130, server cluster 140, server rack 150a, server level 1 154A, and/or one of the servers of the plurality of servers 160A may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on computing device 120, administrator computing device 130, server cluster 140, server rack 150a, server level 1 154A, and/or one of the servers of the plurality of servers 160A may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 120, administrator computing device 130, server cluster 140, server rack 150a, server level 1 154A, and/or one of the servers of the plurality of servers 160A may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
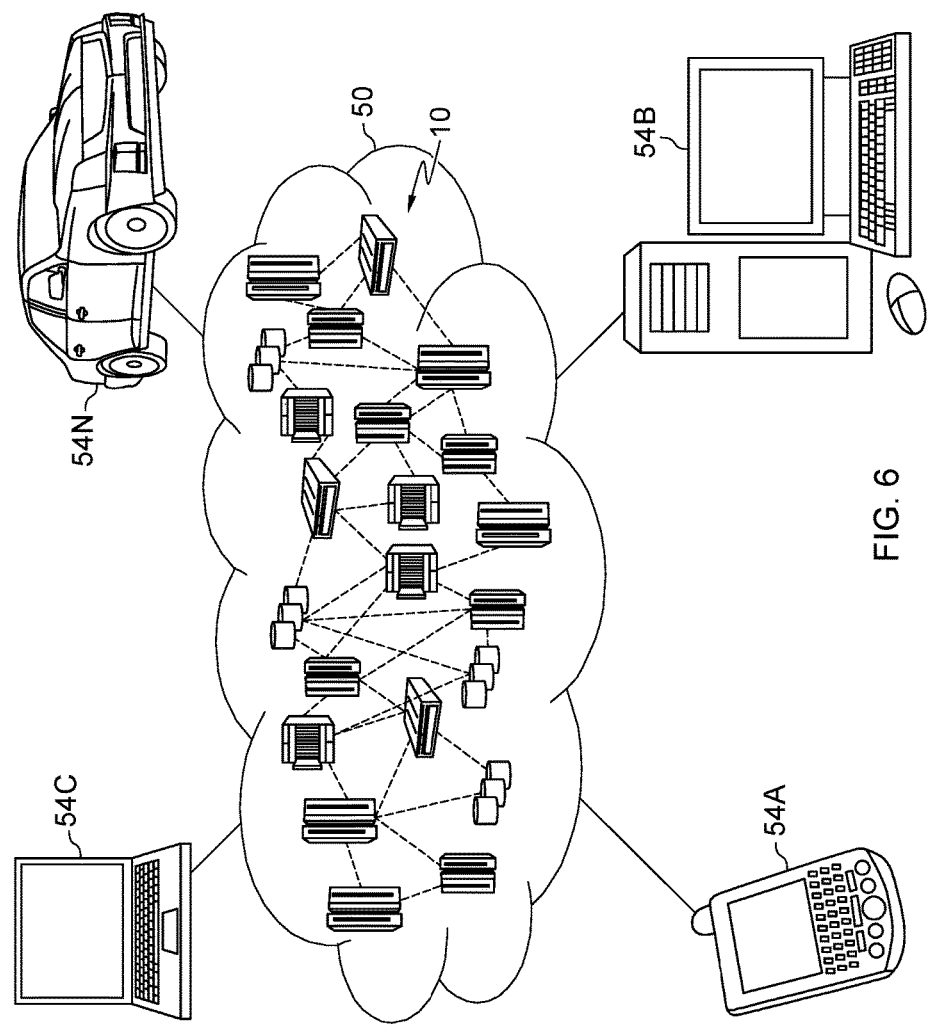
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and memory management module 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for allocating memory, the method comprising:

receiving, by a computer, an allocation request for memory allocation to a computer node, wherein the computer node resides in a server cluster comprising a plurality of server racks, the server racks comprising a plurality of server levels, the server levels comprising a plurality of computer nodes;

determining, by a computer, whether execution of the allocation request is to be carried out within the server cluster on a cluster level, a server rack level, or on a server level;

retrieving, by a computer, a memory policy associated with the determined level of the server cluster for executing the allocation request, the memory policy being retrieved from a memory policy database;

determining, by a computer, an amount of available memory for allocation on the determined level of the server cluster;

determining whether there is enough of the available memory to meet the allocation request on the determined level of the server cluster; and allocating, by a computer, the available memory on the determined level of the server cluster to address the received request based on the retrieved memory policy, in response to determining there is enough of the available memory on the determined level of the server cluster to meet the allocation request.

2. The method of claim 1, wherein the received request for memory was sent by an administrator to address a memory need.

3. The method of claim 1, wherein the received request for memory was sent by a first computer node of the plurality of computer nodes because the first computer node requires more memory to address the first computer node's memory needs.

4. The method of claim 1, wherein the allocating, by a computer, the available memory to address the received request based on the retrieved memory policy, comprises:

assigning, by a computer, the available memory to the computer node associated with the request and a multiplexer associated with the computer node.

5. The method of claim 1, wherein the memory policies associated with the cluster level, the rack level and the server level are based on a threshold, the threshold defining a minimum or a maximum number of memory units that can be assigned to a compute node.

6. The method of claim 1, wherein the memory policies associated with the cluster level, the rack level and the server level are based on priority of the requesting compute node and the other compute nodes of the server cluster.

7. The method of claim 1, wherein the memory policies associated with the cluster level, the rack level and the server level are based on a granularity, the granularity defining the minimum hardware limitations of the compute nodes.

8. The method of claim 1, further comprising:

in response to determining that there is not enough available memory to address the memory request, identifying, by a computer, currently allocated memory that can be reassigned from its current allocation.

9. The method of claim 8, further comprising:

withdrawing, by a computer, the identified allocated memory for reassignment from its current allocation; and reallocating, by a computer, the withdrawn available memory by assigning the withdrawn available memory to a first computer node of the plurality of computer nodes and a multiplexer associated with the first computer node based on the retrieved memory policy.

10. The method of claim 1, wherein memory policies associated with the cluster level, the rack level and the server level are different.

11. The method of claim 10, wherein an administrator is able to draft or change the memory policies stored on the memory policy database.

* * * * *